United States Patent

[11] 3,603,200

[72] Inventor Kenji Hiruma
 Tokyo, Japan
[21] Appl. No. 28,245
[22] Filed Apr. 17, 1970
[45] Patented Sept. 7, 1971
[73] Assignee Kabushiki Kaisha Ricoh
 Toyko, Japan
[32] Priority Apr. 27, 1966, Jan. 27, 1967, Jan. 27, 1967
[33] Japan
[31] 41/26838, 42/5027 and 42/6706
 Continuation of application Ser. No. 633,518, Mar. 25, 1967.

[54] ROOF-TYPE REFLECTING MIRROR FOR VIEWFINDER OF SINGLE LENS REFLEX CAMERA
 1 Claim, 2 Drawing Figs.
[52] U.S. Cl. .................................................. 88/1.5 R
[51] Int. Cl. .................................................. G03b 13/02
[50] Field of Search .................................................. 88/1.5, 95/42, 44

[56] References Cited
UNITED STATES PATENTS
2,911,682 11/1959 Ewald .......................... 350/286
3,218,946 11/1965 Lange .......................... 88/1.5

Primary Examiner—Ronald L. Wibert
Assistant Examiner—Orville B. Chew, II
Attorney—Burgess, Ryan & Hicks ABSTRACT: A reflecting mirror for the viewfinder system of a single lens reflex camera has roof walls with interior reflecting surfaces meeting to form a roof-shaped reflecting member. The roof walls are spanned by a triangular front wall and located in place by a vertical lateral wall. The lateral walls are united by an eyepiece holding frame. The whole structure is adapted for molding as a single unitary plastic piece.

PATENTED SEP 7 1971

3,603,200

INVENTOR.

BY Kenji Niime

Burgess, Ryan & Hicks
ATTYS.

ROOF-TYPE REFLECTING MIRROR FOR VIEWFINDER OF SINGLE LENS REFLEX CAMERA

This application is a continuation of copending U.S. Pat. application, Ser. No. 633,518, filed Apr. 25, 1967.

In a roof-edge pentaprism used in a viewfinder unit of a single lens reflex camera, each of the reflecting surfaces needs to be accurately positioned relative to the other. In particular, precision of the included angle between a first reflecting surface and a second reflecting surface is of critical importance as the slightest error allowance therein can render an image in the viewfinder discontinuous along a vertical central line thereof, which deprives the viewfinder of its function. Such high precision required for manufacturing a roof-edge pentaprism makes it extremely difficult to produce it at low cost.

In the present invention, a roof-type reflecting mirror having reflecting mirrors formed on the interior walls thereof, and a moving portion with which said roof-type reflecting mirror is attachable on the camera body, are integrally molded.

BRIEF DESCRIPTION OF THE ACCOMPANYING DRAWINGS

DETAILED DESCRIPTION OF THE PRESENT INVENTION

Figure 1:
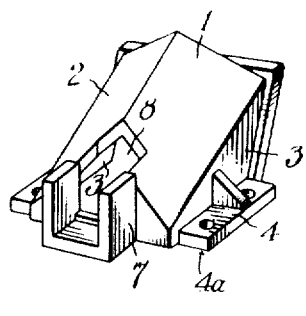
FIG. 1 is a perspective view of a roof-type reflecting mirror showing a preferred embodiment of this invention.
Figure 2:
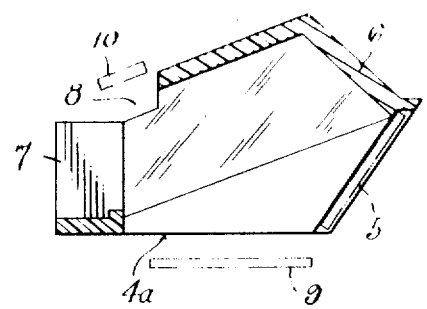
FIG. 2 is a section view of the above roof-type reflecting mirror taken along a plane including top edge of said mirror.

Roof-type walls 1 and 2 and the lateral walls 3 as shown in the drawings are integrally formed by compressing a soluble synthetic resin, such as acryl resin, into a durable metal mold having a roof-type surface which is treated with a mirror finish, after which the interior wall surfaces of said roof shape walls 1 and 2 are given a mirror finish by spattering. A mounting portion 4 is attachable on the top surface of the camera body and is provided integral with, and extending from, the lower portion of lateral walls 3, bottom surface 4a of said mounting portion being so designed as to take a correct position relative to the aforesaid roof-type reflecting mirrors.

A third reflecting mirror 5 cooperating with said roof-type reflecting mirror is adapted to be held in a correct position by the bottom edge of a nonreflecting wall 6 having a triangle front shape, and a front edge of the aforesaid lateral walls 3. At the rear ends of the roof-type walls 1 and 2 is provided integral therewith a holding frame 7 for an eyepiece (not shown).

An opening 8, which is provided at the rear portion of the aforesaid roof shape walls 1 and 2 and outside of the effective reflecting surfaces of the roof-type reflecting mirror, receives a portion of a beam of rays passing through a focusing plate 9 and is useful as a window for a light receptor 10 of a light meter means with which brightness of the scene being photographed is measured.

According to the present invention, therefore, manufacturing processes required are considerably reduced as compared with the conventional roof-edge pentaprisms. Furthermore, use of a metal mold with accurately defined included angle between roof-type surfaces assures mass production of uniform products of high precision, which makes possible considerable cost reduction, as well as improvement of the shock proof qualities and a reduction in the weight of single lens reflex cameras.

The structure shown is adapted for molding in that a male mold may be withdrawn directly downward from the interior of the molded viewfinder unit as shown in FIG. 1. The absence of a mirror 5 during molding of structure makes such withdrawal possible. In addition, the molded structure has a shape which makes it easy to "silver" the interior surfaces of roof-type walls 1 and 2, since the lack of a molded-in mirror in place of mirror 5 makes it easy for the vaporized aluminum coating to reach all parts of the roof-type walls evenly during "silvering."

In lieu of a roof edge pentaprism a composite roof-type reflecting mirror consisting of two individual flat mirrors connected at right angles is already known in the art. However, with this type of roof-type reflecting mirror using two individual mirrors, the edge line at the connecting portion tends to become broad, as a result of which a drawback of said edge line becoming visible and interfering with the viewfinder image is likely to present itself.

Furthermore, the necessity of mounting said two individual mirrors on supporting members not only complicates the manufacturing process but also lowers the required precision.

I claim:

1. A viewfinder structure for a single lens reflex camera having a rectangular horizontal focusing plate comprising:
   first and second opposed parallel lateral walls spaced apart a distance substantially equal to one side of the focusing plate, said walls having bottom edges adapted to contact the camera body on opposite sides of the focusing plate and parallel front edges extending upward and forward from the bottom edges;
   a roof-type wall extending inwardly and upwardly from each lateral wall, each said roof-type wall having a flat reflecting internal surface, said internal surfaces meeting at a desired angle less than 180° along a line of intersection, said line of intersection extending forward and upward at an acute angle relative to the plane of the focusing plate;
   a triangular front wall extending between the roof-type walls and having a bottom edge extending between the lines of intersection between the roof-type walls and the lateral walls;
   a mirror frame formed by said bottom edge of the front wall cooperating with the front edges of the lateral walls;
   a plane reflecting mirror positioned within said mirror frame, said reflecting mirror extending upward and forward from the forward edge of the focusing plate when said viewfinder structure is in place on the camera body;
   an eyepiece-holding frame extending between the lateral walls adjacent the lower edges thereof at the rear of said lateral walls;
   said first and second lateral walls, roof-type walls, front wall, and eyepiece-holding frame being integrally formed of plastic.